(12) United States Patent
Lecat

(10) Patent No.: US 7,645,141 B2
(45) Date of Patent: Jan. 12, 2010

(54) ARRANGEMENT FOR AUSCULTATION TRAINING

(76) Inventor: Paul Jacques Charles Lecat, 1098 Maple St., Tallmadge, OH (US) 44278

( * ) Notice: Subject to any disclaimer, the term of this patent is extended or adjusted under 35 U.S.C. 154(b) by 345 days.

(21) Appl. No.: 11/523,224

(22) Filed: Sep. 19, 2006

(65) Prior Publication Data

US 2007/0178430 A1 Aug. 2, 2007

Related U.S. Application Data

(60) Provisional application No. 60/718,368, filed on Sep. 19, 2005.

(51) Int. Cl.
G09B 23/28 (2006.01)

(52) U.S. Cl. ...................... 434/266; 434/262

(58) Field of Classification Search .............. 434/262, 434/266
See application file for complete search history.

(56) References Cited

U.S. PATENT DOCUMENTS

| 3,947,974 | A | * | 4/1976 | Gordon et al. ............... 434/266 |
| 4,770,189 | A | | 9/1988 | Shyu |
| 6,220,866 | B1 | | 4/2001 | Amend et al. |
| 6,503,087 | B1 | * | 1/2003 | Eggert et al. ............... 434/262 |
| 6,527,559 | B2 | * | 3/2003 | Yoshii et al. ............... 434/266 |
| 7,115,102 | B2 | | 10/2006 | Abbruscato |
| 7,209,796 | B2 | | 4/2007 | McKinney et al. |

| 2004/0076303 | A1 | 4/2004 | Vyshedsky et al. |
| 2004/0157612 | A1 | 8/2004 | Kim |
| 2005/0048455 | A1 | 3/2005 | Hayamizu et al. |
| 2005/0131307 | A1 | 6/2005 | Ruiter et al. |
| 2005/0148283 | A1 | 7/2005 | Schwalm |

FOREIGN PATENT DOCUMENTS

| JP | 09-146452 | 6/1997 |
| JP | 2005-077521 | 3/2005 |
| JP | 2005-227534 | 8/2005 |
| WO | WO2006/047400 | 5/2006 |

OTHER PUBLICATIONS

Technology To Inspire: Technology Archive Electronic Stethoscope, Young Foresight:Technology to Inspire, Project Centre Report Jul. 7, 2003.

* cited by examiner

*Primary Examiner*—Cameron Saadat
(74) *Attorney, Agent, or Firm*—Roger D. Emerson; Nathan B. Webb; Emerson Thomson and Bennett, LLC

(57) ABSTRACT

An arrangement and method for auscultation training is provided including a transmitter associated with an audio device for transmitting an audio signal to an auscultation device. The auscultation device may include a receiver for receiving the audio signal from the transmitter and a speaker for relaying the sound to the end user. The arrangement may allow for the broadcast of simulated medical sounds to a generally, normal appearing auscultation device for the purposes of teaching or testing using simulated patient scenarios, while allowing for normal person-to-person interaction between the simulated patient and physician.

16 Claims, 3 Drawing Sheets

ARRANGEMENT FOR AUSCULTATION TRAINING

RELATED APPLICATIONS

This application claims the benefit of U.S. Provisional Patent Application Ser. No. 60/718,368 filed Sep. 19, 2005, for TRAINING STETHOSCOPE, the entire disclosure of which is fully incorporated herein by reference.

BACKGROUND

Auscultation is the act of listening to sounds within the body as a method of diagnosis. A stethoscope is an example of an auscultation device that is used in the medical field to listen to internal sounds in the human body, such as for example heart sounds, breathing (breath sounds), intestinal noises, and blood flow in arteries and veins. Acoustic stethoscopes operate on the transmission of sound from a head piece, via air-filled hollow tubes, to the listener's ears. The head piece may include a diaphragm that can be placed against a human body for sensing sound. Body sounds vibrate the diaphragm, creating acoustic pressure waves that travel up the tubing to the listener's ears.

Using a stethoscope or other auscultation device to diagnosis a patient requires training in detecting and identifying the abnormal auditory findings. Standardized patients are a valuable training tool in Medical Education and have been extensively researched. Though standardized patients give students one-on-one interaction with real patients, most standardized patients do not have abnormal physical findings. As a result, simulators and mannequins are often used to train or test students on auscultation devices, such as stethoscopes. Auscultation training mannequins may include a sound generating device embedded within the body of the mannequin to produce sounds consist with an abnormal physical condition, which students must detect and identify.

SUMMARY

The present application discloses an arrangement and method for auscultation training. In particular the invention relates to an arrangement that provides for the transmission of audio signals to an auscultation device for medical simulation.

In accordance with one embodiment, an arrangement is provided including a transmitter associated with an audio device for transmitting an audio signal to an auscultation device. A receiver for receiving the audio signal from the transmitter and a speaker for relaying the sound to the end user are associated with the auscultation device. In one embodiment, the transmitter sends a wireless signal to auscultation device. In another embodiment, the auscultation device is a stethoscope modified to include a receiver and speaker.

In accordance with another embodiment, a method for transmitting auditory findings to a modified auscultation device is provided. The method may include wirelessly transmitting an audio signal from a remote location to the modified auscultation device, receiving the signal on the auscultation device, and relaying the sound represented in the audio signal to the end user through the auscultation device.

Further aspects and concepts will become apparent to those skilled in the art after considering the following description and appended claims in conjunction with the accompanying drawings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of the invention.

DETAILED DESCRIPTION

The present application discloses an arrangement for auscultation training. While the exemplary embodiments illustrated and described herein are presented in the context of medical diagnosis using a stethoscope including a FM radio receiver for receiving audio signals from a remote FM transmitter associated with an audio device, those skilled in the art will readily appreciate that the present invention may be used and configured in other ways. For example, all of the exemplary arrangements, though referred to as for auscultation training, may be used outside of the medical profession for training in the diagnosis of problems with equipment or engines or any anything that may be diagnosed by detecting and identifying a characteristic sound generated from the thing. In addition, the remote transmitter and receiver need not necessarily be an FM radio transmitter and receiver, but may utilize any suitable wireless technology capable of transmitting an audio signal, such as for example, AM radio frequency, Bluetooth, ZigBee, WiFi, and other technologies. Furthermore, the device used to detect the sound on the person or thing being diagnosed need not necessarily be a stethoscope, but can be any suitable auscultation device or sound detecting device.

While various aspects and concepts of the invention are described and illustrated herein as embodied in combination in the exemplary embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, software, hardware, control logic and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

Figure 1:
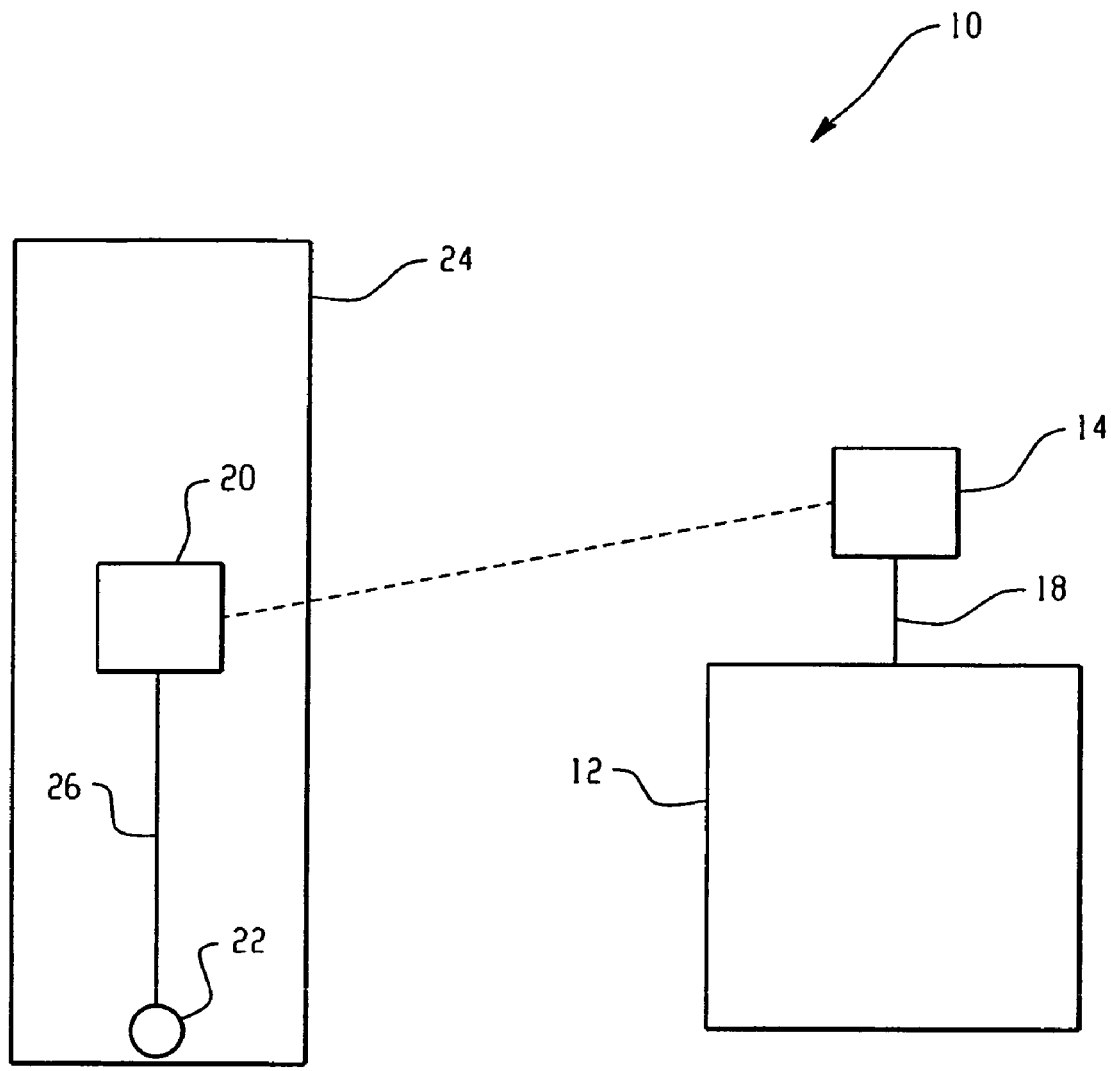
FIG. 1 is a schematic illustration of an embodiment of an exemplary arrangement for auscultation training.

FIG. 1 schematically illustrates an embodiment of an exemplary arrangement for auscultation training. The arrangement 10 may include a device 12 capable of generating an audio signal representing at least one sound and a wireless transmitter 14 associated with the device. The device 12 capable of generating an audio signal may be any of a wide variety of devices, such as for example, a compact disc player, a cassette player, a digital audio player (e.g. MP3 player, IPod player from Apple Computers), a personnel digital assistant (PDA), a computer, or other suitable device. The device 12 may have a wide variety of sounds stored in memory as audio signals, thus creating a large number of sounds that may be transmitted as audio signals at the choice of the user for very specific teaching, testing, or research.

The wireless transmitter 14 may be integrated with the device 12 or may be in circuit communication with the device. For example, the device 12 may include an output 16 such as for example, a USB port, a headphone jack or other similar output, and the wireless transmitter 14 may connect to the output 16 by, for example, an electrical wire and connection 18, such that the device 12 may communicate an audio signal to the transmitter 14.

The arrangement 10 may also include a receiver 20 remote from the transmitter 14 and adapted to receive a wireless audio signal from the transmitter. The receiver 20 and transmitter 14 may utilize any suitable wireless technology capable of communicating an audio signal from the transmitter to the receiver. For example, the transmitter 14 may transmit using FM radio, AM radio, Bluetooth, ZigBee, WiFi, or other suitable technologies.

The arrangement 10 may also include an audio output device 22, such as a speaker for example, capable of communicating the one or more sounds represented in the audio signal to an end user. The receiver 20 and output device 22 may be attached to or integrated in an auscultation device 24, such as for example, a stethoscope. The output device 22 may be integral with the receiver 20 or in communication with the receiver, such as for example, via an electrical wire and connection 26.

Figure 2:
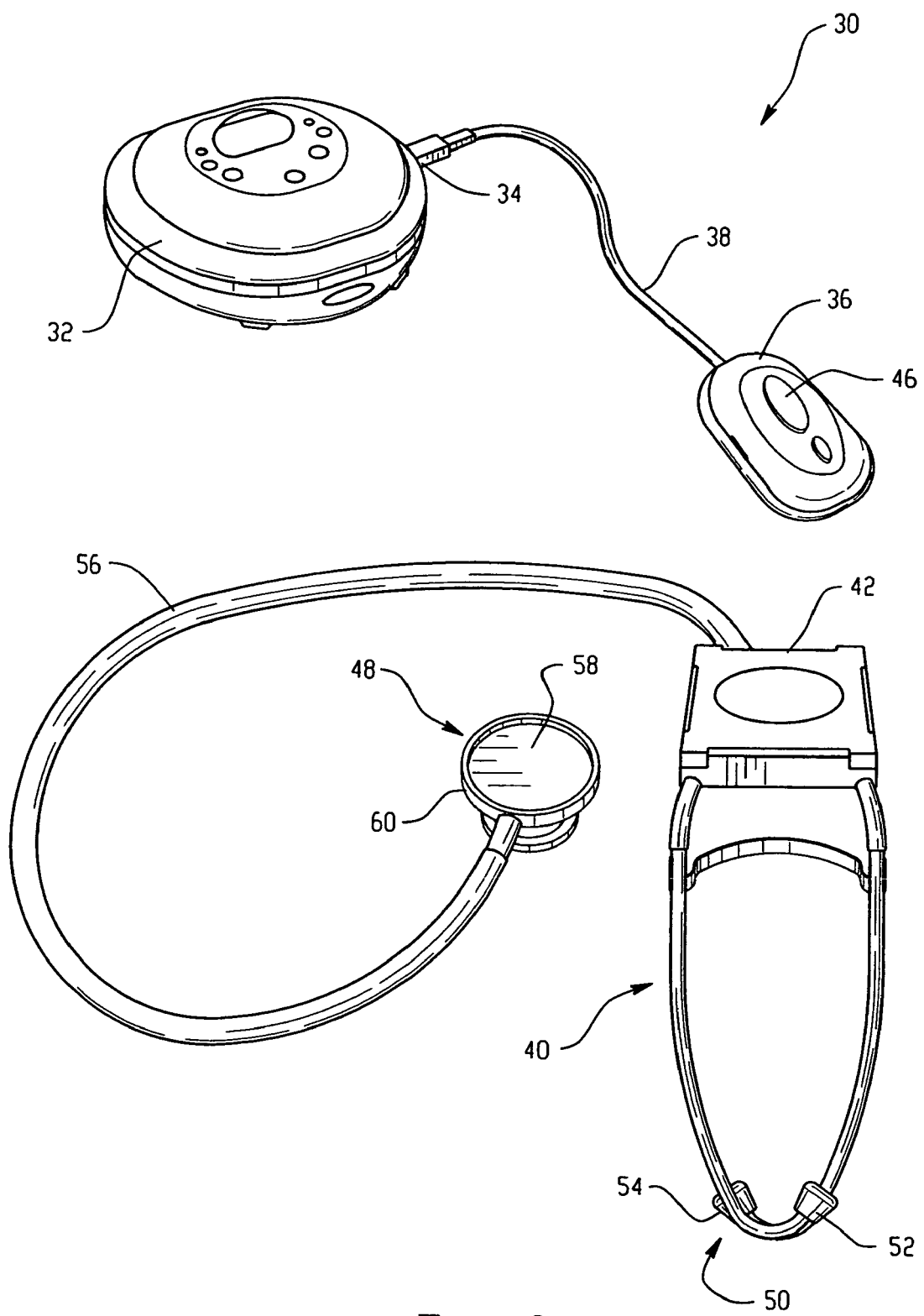
FIG. 2 an illustration of another embodiment of an exemplary arrangement for auscultation training.

FIG. 2 illustrates an embodiment of an exemplary arrangement for auscultation training. The arrangement 30 in FIG. 2 includes an audio device 32 similar to the device 12 described in relation to the arrangement 10 of FIG. 1. The audio device 32 may include an output 34, such as a headphone output jack. A FM radio transmitter 36 may attach to the audio device 32 via a wire 38 that plugs into the output 34. The embodiment of FIG. 2 also includes an auscultation device 40 realized as a stethoscope and a FM radio receiver 42 and a speaker 44 (see FIG. 3) mounted to the stethoscope 40.

The FM radio transmitter 36 depicted in FIG. 2 may be similar to those used to transmit audio signal from a portable compact disc player to a automobile stereo, as is known in the art. Any suitable FM radio transmitter (or other types of transmitters), however, may be used. The transmitter 36 may have the capability to broadcast on several frequencies and may include a tuning dial 46 to change broadcast frequency. Additionally, the transmitter 36 may have a plurality of transmitters so that multiple audio signals may be transmitted at the same time at different frequencies to corresponding receivers tuned to the different frequencies within the same area. The transmitter 36 may be configured to operate only in a limited frequency range, such as for example about 88.1 megahertz to about 88.7 megahertz, which represents the industrial, scientific and medical (ISM) radio bands.

The stethoscope 40 is illustrated as an acoustic stethoscope but may be any suitable stethoscope, including an electronic stethoscope. The stethoscope 40 includes a head piece 48, which may be a head piece assembly 48, an ear piece assembly 50, which may include at least one piece, e.g., a pair of ear pieces 52, 54, and tubing 56, which may be a tubing assembly 56, having a generally hollow interior. The tubing assembly 56 connects the ear piece assembly 50 to the head piece assembly 48. The head piece assembly 48 may include a diaphragm 58 and a body portion 60.

Figure 3:
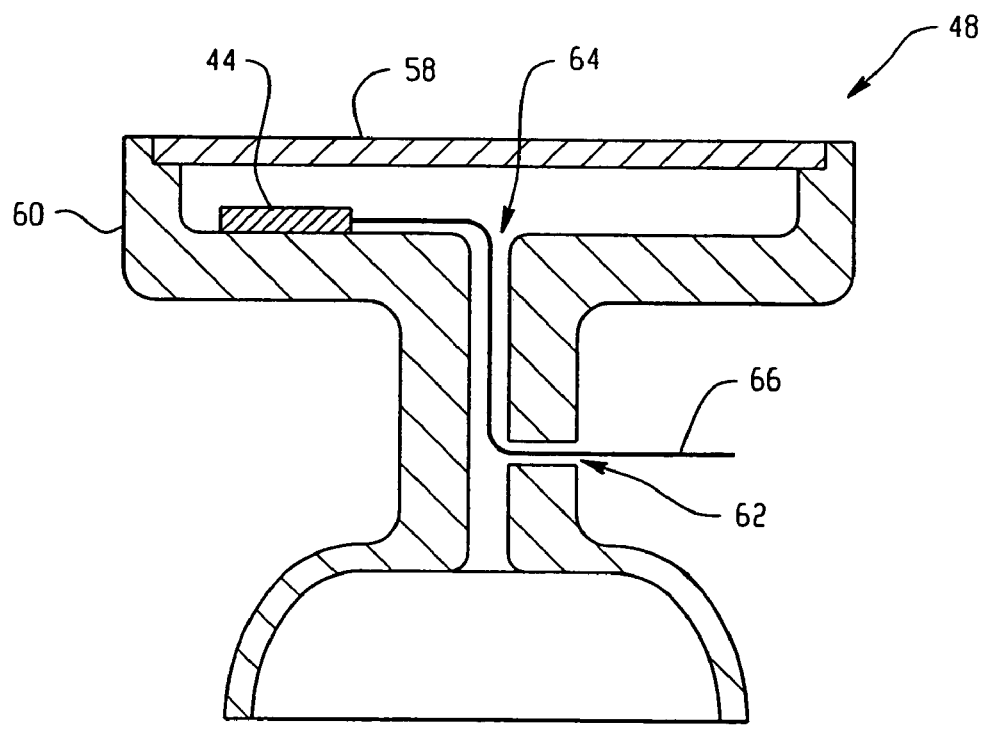
FIG. 3 is cross section of an embodiment of an exemplary stethoscope head-piece assembly of the arrangement of FIG. 2.
Figure 4:
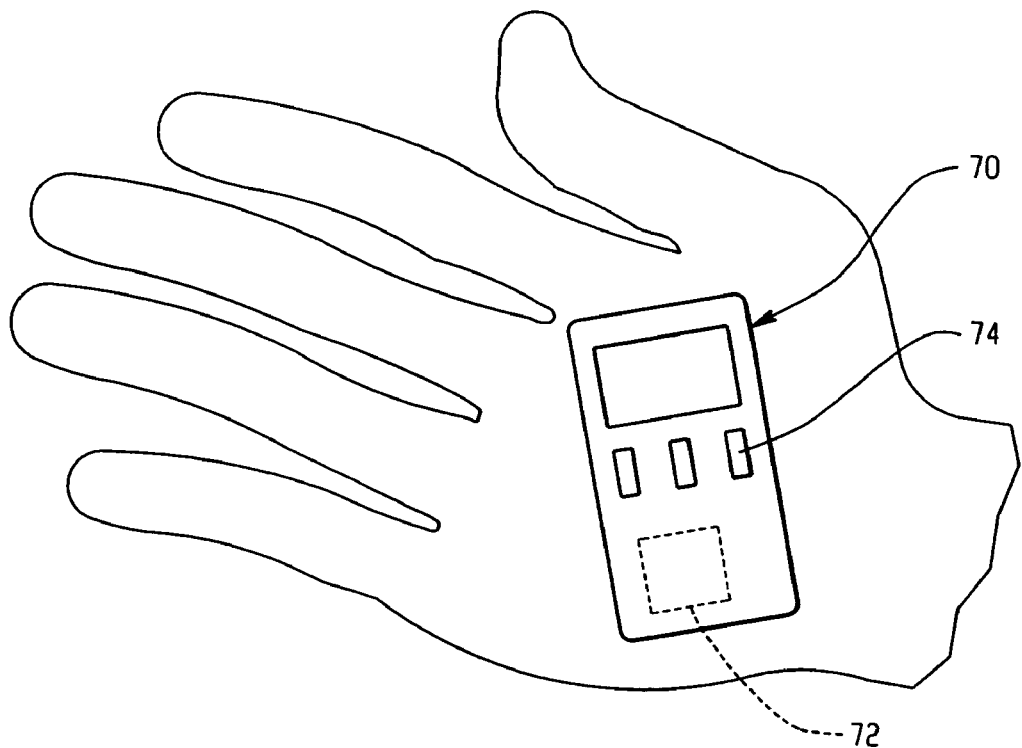
FIG. 4 is an illustration of an embodiment of an exemplary audio device and transmitter of the arrangements of FIGS. 1 and 2.

Referring to FIG. 3, the body portion 60 includes a sound passageway 62 in communication with the hollow interior of the tubing assembly 56. The diaphragm 58 mounts to the body portion 60 adjacent but spaced apart from the opening 64 for the sound passageway 62. The speaker 44 may mount in the space between the diaphragm 58 and the body portion 60, proximate the opening 64, such that speaker 44 is concealed within the head piece assembly 48 while readily communicating sound to the passageway 62. In this manner, the sound generated by the speaker 44 travels through the stethoscope 40 in the same manner as sound generated by the diaphragm 58 would, thus providing a realistic simulation of an auscultatory finding.

The receiver 42 and the speaker 44 may be in circuit communication via an electrical wire or lead 66. The FM radio receiver 42 may attach to the stethoscope 40 in any convenient location. For example, the FM radio receiver 42 may attached to the stethoscope 40 at approximately the location where the tubing assembly 56 branches to each of the ear pieces 52, 54. At this location, the wire 66 may run from the head piece assembly 48 to the receiver 42 inside of the hollow tubing assembly 56. A small opening may be made in the tubing assembly 56 to allow the wire 66 to connect to the receiver 42. The tubing assembly 56 may be sealed around the wire 66 in any suitable manner. Other FM radio receiver and speaker configurations are possible, For example, a small FM radio receiver chip and battery could mount between the diaphragm 58 and the body 60 similar to the speaker 44. Thus, the receiver 42, speaker 44, and power source may all be concealed within the head piece assembly 48 of the stethoscope 40.

The depicted arrangement 30 may include one or more power sources (not shown) in circuit communication with one or more of the devices of the arrangement, such as for example the audio device 32, the transmitter 36, the receiver 42, and/or the auscultation device 40. The one or more power sources may be, for example, one or more batteries enclosed within the devices. Of course, alternate means of providing power to the devices may be used, such as for example, using an external supply of alternating or direct current.

In operation in an auscultation training environment, the audio device 32 of the arrangement 30 depicted in FIG. 2, may be loaded with audio files of abnormal auscultatory findings. For example, if the audio device 32 is a compact disc player, a compact disc containing the audio files may be loaded into the device 32, or if the audio device is a digital audio player, digital audio files may be stored in the device's memory. The audio files may represent a wide variety of sounds. For example, the sounds may include, but are not limited to, heart sounds and murmurs, vascular sounds including bruits, lung sounds, abdominal sounds, and Korotkoff sounds.

The FM radio transmitter 36 may connect to the audio device 32 via the output 34 and the FM radio receiver 42 located on the stethoscope 40 may be tuned in to the transmitter frequency being used. A student or user may then use the stethoscope 40 to examine the patient. If desired, the transmitter 36 and audio device 32 may be placed out of view of the user to provide an improved simulation environment for training and testing.

When the user places the headpiece assembly 48 of the stethoscope 40 in the proper location on the patient, an operator of the audio device 32 may play the appropriate audio file. The sound transmitted though the speaker 44 blocks out other normally heard sounds from the patient such that the user hears only the simulated sound through the stethoscope 40.

Since the sound is being generated within the stethoscope 40, a different audio file may be selected based on certain variables. For example, appropriate heart sounds may be heard when the head piece assembly 48 is placed in different locations or when the patient is in different positions. Vascular sounds such as bruits may be simulated in a similar manner.

The arrangement 30, therefore, provides for the broadcast of abnormal simulated medical sounds to a generally, normal appearing stethoscope for the purposes of teaching or testing using simulated patient scenarios, while allowing for normal person-to-person interaction between the simulated patient and physician.

Because multiple frequencies can be used, two or more stethoscopes could have different audio findings within the same room for simulation involving a group of clinicians. The range of the transmitter 36 may be selected as appropriate. For example, the transmitter 36 can be selected or adjusted to limit the effective range to allow multiple arrangements to be used in the same general areas without interfering with each other.

FIG. 3 illustrates another embodiment of an exemplary audio device and transmitter for use in the arrangements of FIGS. 1 and 2. The audio device 70 may be realized as a compact digital audio player adapted to be concealed in the palm of a hand. The audio device 70 may include an integrated FM transmitter chip 72 and one or more buttons 74 for operating the device. Thus, the audio device 70 may be operated by the patient being examined. This allows the patient to activate an appropriate audio file stored on the audio device 70 for transmission when the auscultation device and patient are properly positioned for detecting the sound represented by the audio file.

The invention has been described with reference to the preferred embodiments. Modification and alterations will occur to others upon a reading and understanding of this specification. It is intended to include all such modifications and alterations insofar as they come within the scope of the appended claims or the equivalents thereof.

The invention claimed is:

1. An arrangement for auscultation training, comprising:
   a signal generator capable of generating an audio signal representing at least one sound, the signal generator being controlled by a human operator, wherein the human operator plays one or more appropriate audio files according to a user's placement of a stethoscope headpiece on a patient;
   a transmitter associated with the device for transmitting an audio signal corresponding to the at least one sound;
   an auscultation device, comprising a stethoscope, remote from the transmitter, the auscultation device comprising:
   a receiver adapted to receive the audio signal from the transmitter; and
   a speaker adapted to audibly communicate the audio signal received by the receiver to the user.

2. The arrangement of claim 1 wherein the auscultation device further comprises:
   a head piece connected to at least one ear piece by tubing; wherein the speaker is proximate the head piece such that sound transmitted by the speaker is communicated from the head piece to the at least one ear piece via the tubing.

3. The arrangement of claim 2 wherein the head piece comprises a diaphragm and a body portion; the speaker being positioned within the head piece.

4. The arrangement of claim 3 wherein the receiver is positioned within the head piece.

5. The arrangement of claim 1 wherein the auscultation device is a stethoscope.

6. The arrangement of claim 1 wherein the transmitter is an FM radio transmitter.

7. The arrangement of claim 6 wherein the transmitter can transmit the audio signal with a carrier frequency in the range of about 88.1 megahertz to about 88.7 megahertz.

8. The arrangement of claim 1 wherein the audio signal is representative of an abnormal human physical condition.

9. The arrangement of claim 1 wherein the audio signal is representative of one of: heart sounds, heart murmurs, vascular sounds, lung sounds, abdominal sounds, or Korotkoff sounds.

10. The arrangement of claim 1 wherein the transmitter wirelessly transmits the audio signal to the receiver.

11. The arrangement of claim 1 wherein the signal generator comprises at least one device from the following list of devices: a compact disc player, a cassette player, a digital audio player, a personal digital assistant, and a computer.

12. A method for simulating auditory findings in an auscultation device, comprising:
   an operator observing the placement of an auscultation device by a user relative to a patient;
   the operator selecting an auscultation sound appropriate to the position of the auscultation device relative to the patient;
   transmitting an audio signal corresponding to the selected auscultation sound from a location remote to the auscultation device;
   receiving the audio signal on the auscultation device;
   communicating at least one sound represented by the audio signal to the user of the auscultation device.

13. The method of claim 12 wherein the auscultation device is a stethoscope.

14. The method of claim 12 wherein audio signal is representative of an abnormal human physical condition.

15. The method of claim 12 wherein the audio signal is transmitted on a FM radio frequency.

16. The method of claim 12 wherein the step of communicating the at least one sound represented by the audio signal to a user of the auscultation device comprising playing the sound with a speaker.

* * * * *